UNITED STATES PATENT OFFICE.

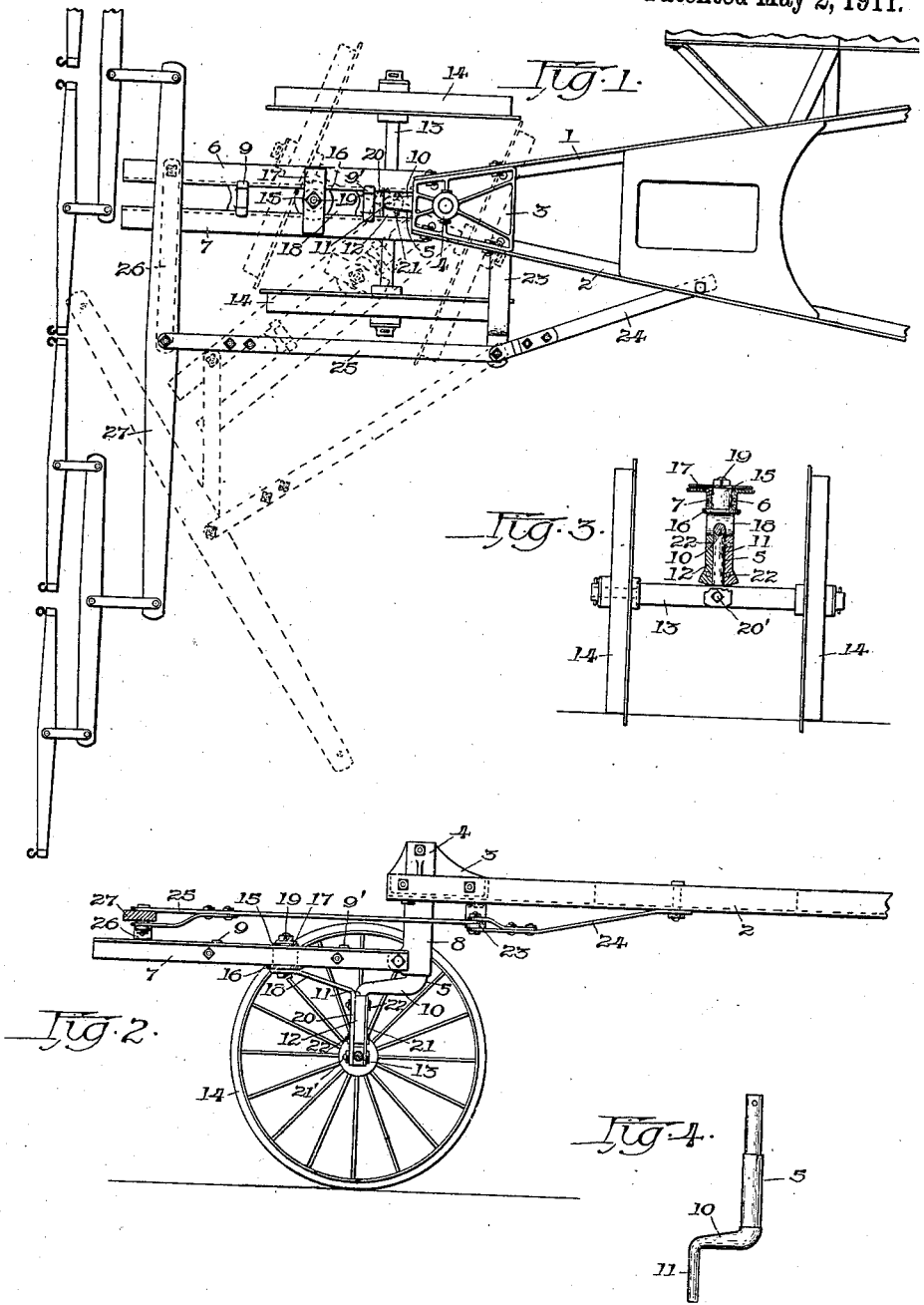

CHARLES A. A. RAND, OF CHICAGO, ILLINOIS, ASSIGNOR TO INTERNATIONAL HARVESTER COMPANY, A CORPORATION OF NEW JERSEY.

TONGUE-TRUCK.

991,019.     Specification of Letters Patent.     Patented May 2, 1911.

Application filed November 10, 1910. Serial No. 591,552.

*To all whom it may concern:*

Be it known that I, CHARLES A. A. RAND, a citizen of the United States, residing at Chicago, in the county of Cook and State of Illinois, have invented certain new and useful Improvements in Tongue-Trucks, of which the following is a specification.

My invention relates to tongue trucks designed to carry the forward end of a stub tongue mounted on a harvester, and consists in an improved truck frame mechanism, the object of the invention being to provide means whereby the draft devices may be attached at one side of the truck frame in a manner permitting the use of several draft animals abreast in the operation of the machine.

I attain this object by means of the mechanism illustrated in the accompanying drawing, in which—

Figure 1 represents a top plan view of my improved truck and part of the stub tongue attachment for a harvester; Fig. 2 is a side elevation of Fig. 1, with one of the truck wheels removed; Fig. 3 is a front elevation of the truck axle and wheels, showing the manner of connecting the axle with the draft and steering devices; and Fig. 4 is a detached detail of the steering frame.

The same reference characters designate like parts throughout the several views.

1 and 2 represent right and left hand forwardly converging bars forming part of a stub tongue attachment, and designed to have their rear ends connected with the harvester frame, 3 a spacing member secured to the front ends of the bars and provided with a vertically arranged socket 4, in which is secured the upper end of a truck steering crank 5.

6 and 7 represent right and left hand truck tongue members having their rear ends secured to a vertically arranged sleeve 8 that is journaled upon the truck steering crank below the socket member 4, and 9 and 9¹ represent spacing blocks secured to the truck tongue members between their forward and rear ends.

10 represents the crank arm of the steering crank, having a depending stem 11 that is loosely received by a socket member 12 that is adapted to turn thereon.

13 represents a truck axle having wheels 14 journaled at opposite ends thereof; 15 is a fulcrum block slidably mounted between the truck tongue members intermediate the spacing blocks, having a flange 16 at its lower end, and 17 represents a plate secured to its upper end and extending across the upper surfaces of the adjacent truck tongue members.

18 is a truck steering member having its forward end secured to the lower end of sliding block 15 by means of the same bolt 19 that secures the plate to its upper end, the truck steering member extending rearward and downward and provided with a vertical portion 20 that is secured to the socket member 12 and extending below the socket member is pivotally connected with the truck axle 13 by means of a horizontally arranged bolt 20¹ that passes through an opening in the axle and through the lower end of a backing plate 21 that is secured to the rear side of the socket member by means of the same bolts 22 that connect it with the steering member 18. When the truck tongue is turned in a lateral direction for the purpose of turning the machine, as shown by dotted lines in Fig. 1, the sleeve 8, secured to its rear end, turns about its pivotal connection with the steering crank 5, and the fulcrum block 15, connected with steering member 18, sliding between the tongue members, causes the truck axle to turn with the truck tongue members, its coupling relation therewith being determined by the relative distance between the vertical axes of the truck axle, the sleeve 8 and the fulcrum block 15.

A supplemental draft and steering frame is mounted upon the stub tongue attachment of the harvester and the truck tongue members, including a laterally projecting bar 23 having one end secured to the stub tongue attachment near its forward end, the opposite end of the bar being connected with the stub tongue attachment by means of a brace member 24, forming with the bar a triangular laterally projecting draft member, to which is pivotally connected the rear end of a draft bar 25, the forward end of said draft bar being pivotally connected with the forward end of the truck tongue members by means of a swinging link 26, and 27 represents a draft evener connected with the forward end of the draft bar.

What I claim as my invention, and desire to secure by Letters Patent, is:

1. A tongue truck for harvesters including, in combination, a stub tongue attachment, a vertically arranged truck steering crank secured to the forward end of said stub tongue, said steering crank including a forwardly projecting arm having a depending stem, a truck tongue member having its rear end pivotally connected with said steering crank, a fulcrum block slidably mounted upon said truck tongue member, a truck steering member having its forward end secured to said fulcrum block and its rear end pivotally connected with said steering crank stem, and a truck axle secured to said steering member and adapted to turn about said steering crank stem upon a vertical axis.

2. A tongue truck for harvesters including, in combination, a stub tongue attachment, a vertically arranged truck steering crank secured to the forward end of said stub tongue, said steering crank including a forwardly projecting arm having a depending stem, a truck tongue member having its rear end pivotally connected with said steering crank, a fulcrum block slidably mounted upon said truck tongue member, a vertically arranged socket member journaled upon said steering crank stem, a truck steering member having its forward end secured to said fulcrum block and its rear end to said socket member, and a truck axle pivotally connected with said steering member upon a horizontal pivot and adapted to turn with said socket member upon said steering crank stem.

3. A tongue truck for harvesters including, in combination, a stub tongue attachment, a vertically arranged truck steering crank secured to the forward end of said stub tongue, said steering crank including a forwardly projecting arm having a depending stem, a truck tongue member having its rear end pivotally connected with said steering crank, a fulcrum block slidably mounted upon said truck tongue member, a truck steering member having its forward end secured to said fulcrum block and its rear end pivotally connected with said steering crank stem, a truck axle secured to said steering member and adapted to turn about said steering crank stem, a laterally projecting draft frame secured to said stub tongue attachment, and a draft evener pivotally connected with said draft frame.

4. A tongue truck for harvesters including, in combination, a stub tongue attachment, a vertically arranged truck steering crank secured to the forward end of said stub tongue, said steering crank including a forwardly projecting arm having a depending stem, a truck tongue member having its rear end pivotally connected with said steering crank, a fulcrum block slidably mounted upon said truck tongue member, a truck steering member having its forward end secured to said fulcrum block and its rear end pivotally connected with said steering crank stem, a truck axle secured to said steering member and adapted to turn about said steering crank stem, a laterally projecting draft frame secured to said stub tongue, said draft frame including a fixed bar having one end secured to said stub tongue attachment and its opposite end connected therewith by means of a rearwardly extending brace member, a laterally projecting bar having one end pivotally connected with said truck tongue member and its opposite end having a pivotal link connection with said fixed bar and said brace member.

CHARLES A. A. RAND.

Witnesses:
JOHN M. REGAN,
E. L. SABEY.

Copies of this patent may be obtained for five cents each, by addressing the "Commissioner of Patents, Washington, D. C."